United States Patent
Iturralde et al.

(10) Patent No.: US 10,423,481 B2
(45) Date of Patent: Sep. 24, 2019

(54) RECONCILING REDUNDANT COPIES OF MEDIA CONTENT

(71) Applicant: CISCO TECHNOLOGY, INC., San Jose, CA (US)

(72) Inventors: Carol E. Iturralde, Framingham, MA (US); Eric C. Friedrich, Somerville, MA (US); Matthew F. Caulfield, Clinton, MA (US); Kevin S. Kirkup, Raleigh, NC (US); Keith Millar, W. Sussex (GB); Gareth J. Bowen, Hampshire (GB)

(73) Assignee: Cisco Technology, Inc., San Jose, CA (US)

( * ) Notice: Subject to any disclaimer, the term of this patent is extended or adjusted under 35 U.S.C. 154(b) by 632 days.

(21) Appl. No.: 14/213,156

(22) Filed: Mar. 14, 2014

(65) Prior Publication Data

US 2015/0261600 A1 Sep. 17, 2015

(51) Int. Cl.
*G06F 11/08* (2006.01)
*H04L 29/06* (2006.01)
(Continued)

(52) U.S. Cl.
CPC ............. *G06F 11/08* (2013.01); *H04L 65/60* (2013.01); *H04N 21/236* (2013.01); *H04N 21/2404* (2013.01); *H04N 21/8456* (2013.01)

(58) Field of Classification Search
CPC ......... G06F 17/30575; G06F 17/30159; G06F 17/30283; G06F 11/1489; G06F 11/2094; G06F 17/30067; H04L 67/1095
(Continued)

(56) References Cited

U.S. PATENT DOCUMENTS 7,139,999 B2* 11/2006 Bowman-Amuah ........................
G06Q 10/06
717/100
8,639,971 B1* 1/2014 White ................. G06F 11/0709
707/687
(Continued)

FOREIGN PATENT DOCUMENTS

EP 2624523 A2 8/2013
WO WO 2012/142508 A1 10/2012
WO 2013020709 A1 2/2013

OTHER PUBLICATIONS

International Search Report dated May 18, 2015 cited in Application No. PCT/US2015/018996, 10 pgs.
(Continued)

*Primary Examiner* — Alex Gofman
*Assistant Examiner* — Linh Black
(74) *Attorney, Agent, or Firm* — Merchant & Gould P.C.

(57) ABSTRACT

A system can include a reconciliation engine configured to evaluate metadata in a given manifest file of a plurality of manifest files generated for redundant copies of a given media asset. The metadata describes a condition of a given chunk of media content in one of the redundant copies of the given media asset. The system can also include a manifest modification function configured to modify the given manifest file for the given chunk of media content in response to the reconciliation engine detecting that the given chunk of media content is damaged based on the evaluation of the metadata associated with the given chunk of media content in the given manifest file.

10 Claims, 5 Drawing Sheets

(51) Int. Cl.
*H04N 21/236* (2011.01)
*H04N 21/24* (2011.01)
*H04N 21/845* (2011.01)

(58) Field of Classification Search
USPC .............................. 707/687, 691, 795, 818
See application file for complete search history.

(56) References Cited

U.S. PATENT DOCUMENTS

| | | | |
|---|---|---|---|
| 9,100,700 B2* | 8/2015 | Major | H04N 21/2323 |
| 9,432,704 B2* | 8/2016 | Mutton | H04N 19/40 |
| 9,467,708 B2* | 10/2016 | Soroushian | H04N 19/33 |
| 9,706,509 B2 | 7/2017 | Beheydt et al. | |
| 2004/0172478 A1* | 9/2004 | Jacobs | H04N 21/234327 709/233 |
| 2005/0246612 A1* | 11/2005 | Leis | G06F 11/0727 714/763 |
| 2007/0033154 A1* | 2/2007 | Trainum | G06F 17/30011 |
| 2007/0050336 A1* | 3/2007 | Bugir | G06F 8/00 |
| 2007/0180528 A1* | 8/2007 | Kane | G06F 21/56 726/24 |
| 2008/0037777 A1* | 2/2008 | Ignatius | G06F 21/602 380/44 |
| 2008/0086773 A1* | 4/2008 | Tuvell | G06F 21/55 726/23 |
| 2008/0155390 A1* | 6/2008 | Karim | G06F 17/212 715/208 |
| 2008/0273504 A1 | 11/2008 | Foley | |
| 2009/0119499 A1* | 5/2009 | Cao | G06F 21/57 713/2 |
| 2010/0146040 A1 | 6/2010 | Ramakrishnan et al. | |
| 2010/0191539 A1* | 7/2010 | Loughery, III | G06Q 30/0251 705/1.1 |
| 2010/0218033 A1 | 8/2010 | Safari et al. | |
| 2011/0009991 A1* | 1/2011 | Dinicola | G06F 21/10 700/97 |
| 2011/0083037 A1 | 4/2011 | Bocharov et al. | |
| 2011/0050990 A1 | 7/2011 | Farkash | |
| 2011/0225417 A1* | 9/2011 | Maharajh | G06F 21/10 713/150 |
| 2011/0235703 A1 | 9/2011 | Labrozzi et al. | |
| 2011/0252233 A1* | 10/2011 | De Atley | G06F 11/1458 713/165 |
| 2011/0314130 A1 | 12/2011 | Strasman | |
| 2012/0011270 A1 | 1/2012 | Priddle et al. | |
| 2012/0023251 A1 | 1/2012 | Pyle et al. | |
| 2012/0117225 A1 | 5/2012 | Kordasiewicz et al. | |
| 2012/0128061 A1 | 5/2012 | Labrozzi et al. | |
| 2012/0159098 A1* | 6/2012 | Cheung | G06F 12/0261 711/162 |
| 2012/0265856 A1 | 10/2012 | Major et al. | |
| 2013/0227573 A1* | 8/2013 | Morsi | G06F 9/5083 718/100 |
| 2013/0232289 A1* | 9/2013 | Zhong | G06F 12/0246 711/102 |
| 2013/0315567 A1 | 11/2013 | Narayanan et al. | |
| 2014/0006854 A1* | 1/2014 | Bello | G06F 11/0736 714/15 |
| 2014/0006951 A1* | 1/2014 | Hunter | H04H 60/31 715/719 |
| 2014/0013349 A1 | 1/2014 | Millar et al. | |
| 2014/0019587 A1 | 1/2014 | Giladi | |
| 2014/0025710 A1 | 1/2014 | Sarto | |
| 2014/0059243 A1 | 2/2014 | Reisner | |
| 2014/0079207 A1* | 3/2014 | Zhakov | H04M 3/5175 379/265.03 |
| 2014/0140417 A1 | 5/2014 | Shaffer et al. | |
| 2015/0040169 A1* | 2/2015 | Hoffert | H04L 65/60 725/88 |
| 2015/0256617 A1* | 9/2015 | Klose | H04L 67/1095 709/217 |

OTHER PUBLICATIONS

Chinese Second Office Action issued in Application No. 201580013828.3 dated Feb. 24, 2019, 8 pp.
Dr. Gorry Fairhurst, "MPEG-2 Transmission," Jan. 2001, 7 pages; http://www.erg.abdn.ac.uk/future-net/digital-video/mpeg2-trans.html (9 pgs).
Wikipedia, the free encyclopedia, "MPEG transport stream," Wikipedia, Feb. 26, 2013, 7 pages; http://en.wikipedia.org/wiki/MPEG_transport_stream.
Cable Television Laboratories, Inc., OpenCable tm Specifications, OC-SP-EBP=I01-130118, Jan. 18, 2013 (31 pgs).
Wikipedia, the free encyclopedia, Presentation time stamp, Wikipedia, May 27, 2012, 1 page; http://en.wikipedia.org/wiki/Presentation_time-stamp (1 pg.).

* cited by examiner

US 10,423,481 B2

RECONCILING REDUNDANT COPIES OF MEDIA CONTENT

TECHNICAL FIELD

This disclosure relates to reconciling redundant copies of media content.

BACKGROUND

Adaptive bitrate (ABR) streaming is a technique used in streaming media content over computer networks, including distributed HTTP networks such as the Internet. ABR streaming generally operates by adjusting the quality (e.g., bitrate) of a video stream according to a user's bandwidth and capacity. Service providers that employ ABR streaming have increasing expectations of reliable mechanisms to deliver consistent media content to their users.

DESCRIPTION OF EXAMPLE EMBODIMENTS

Overview

This disclosure relates to reconciling redundant copies of media content.

As one example, a system can include a reconciliation engine configured to evaluate metadata in a given manifest file of a plurality of manifest files generated for redundant copies of a given media asset. The metadata describes a condition of a given chunk of media content in one of the redundant copies of the given media asset. A manifest modification function can be configured to modify the given manifest file for the given chunk of media content in response to the reconciliation engine detecting that the given chunk of media content is damaged based on the evaluation of the metadata associated with the given chunk of media content in the given manifest file.

As another example, a method can include generating a plurality of manifest files for redundant and interchangeable copies of media content for a given media asset. At least one given manifest file of the plurality of manifest files can be evaluated to ascertain a condition of a discrete section of the media content in a corresponding copy of the media content. The method can also include modifying the at least one given manifest file to reference the discrete section of the media content in another of the redundant and interchangeable copies of the media content based on the evaluation indicating that the discrete section of the media content in the corresponding copy of the media content is damaged.

As yet another example, a system can include a plurality of media production pipelines. Each of the plurality of media production pipelines can be configured to generate a redundant copy of a given media asset according to an adaptive delivery profile, each redundant copy of the given media asset including a plurality of chunks of media content. Each of the plurality of media production pipelines can also be configured to generate a manifest file associated with each respective redundant copy of the given media asset to reference the respective plurality of chunks of media content. A manifest modification function can be configured to evaluate a manifest entry in a given manifest file and ascertain a condition of a given chunk of the media content in a corresponding copy of the given media asset and to modify the manifest entry in the given manifest file to reference another copy of the given chunk of the media content generated by another of the plurality of media production pipelines if the evaluation indicates that the condition of the given chunk of the media content in the corresponding copy of the media content is damaged.

Example Embodiments

Figure 1:
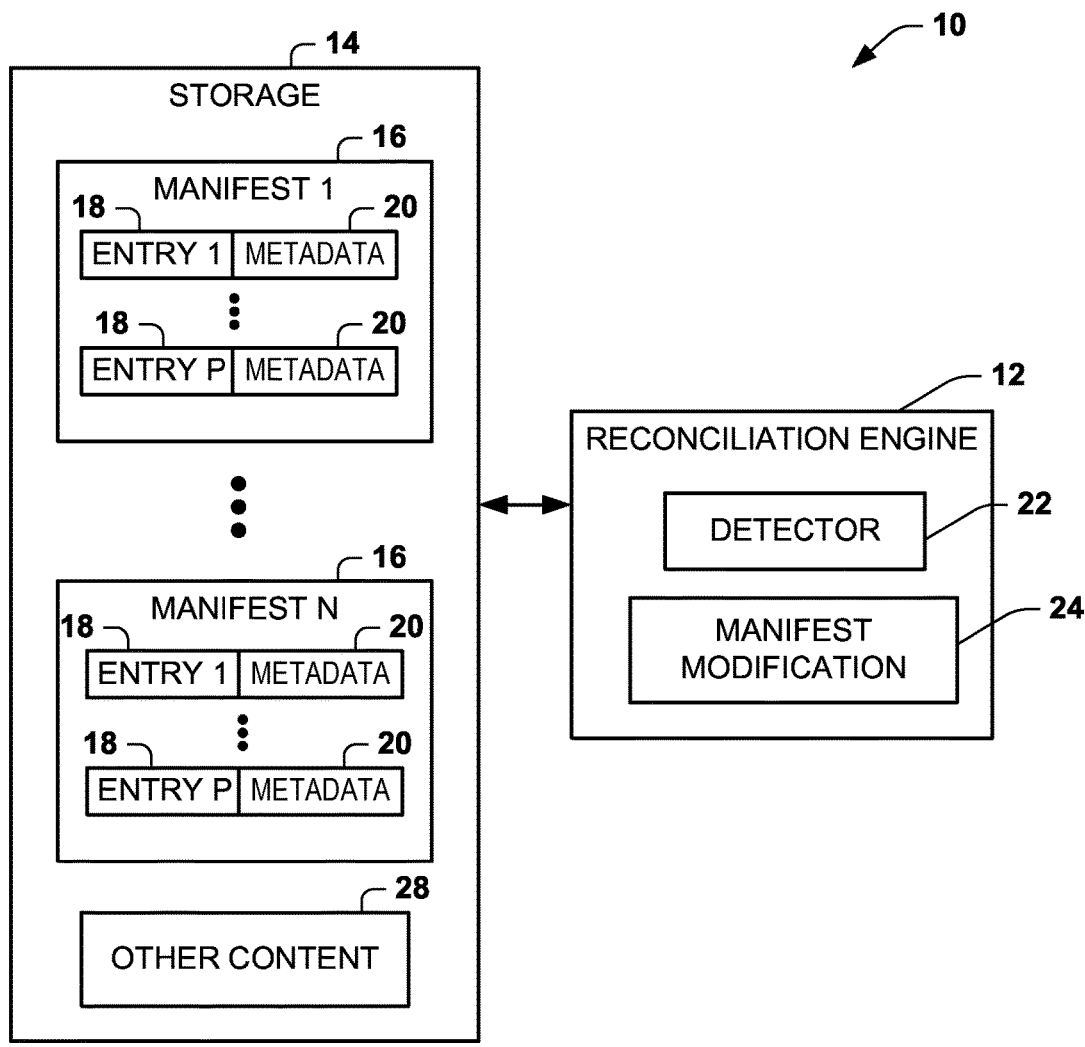
FIG. 1 illustrates an example of a system for reconciling redundant copies of media content.

FIG. 1 depicts an example of a system 10 that can be implemented for reconciling redundant copies of media content. As an example, the system 10 can be implemented in a media content delivery system that includes a plurality of redundant media production pipelines. As used herein in the context of media content, the term "redundant" and its phonetic equivalents refers to a duplication of the content, such as can be generated concurrently by multiple production pipelines and cached for content delivery. In many examples, the content generated by each redundant pipeline should be essentially identical as it typically originates with a common source. However, if one production pipeline malfunctions and damages content in a given stream or content is damaged by other means, such damage likely would not be introduced to the redundant content produced by the other production pipelines. As used herein in the context of media content, the term "redundant" and its phonetic equivalents refer to a duplication of the content, such as can be generated concurrently by multiple production pipelines and cached for content delivery. In many examples, the content generated by each redundant pipeline will be substantially identical as it typically originates from a common source. However, if one production pipeline malfunctions and damages content in a given stream, or content is damaged by other means, such damage is unlikely to be introduced to the redundant content produced by the other production pipelines. Thus, each of the redundant pipelines can be configured to produce redundant, interchangeable copies of media content, which can include content encoded to one or more adaptive bitrate (ABR) formats.

The system 10 thus can be configured to employ any one or more ABR technologies for producing streamable chunks of media content. Examples of ABR technologies that can be implemented in the system 10 can include hypertext transfer protocol (HTTP) Live Streaming (HLS), HTTP Smooth Streaming (HSS-1 or HSS-2), HTTP Dynamic Streaming (HDS), or Dynamic Adaptive Streaming over HTTP (DASH) or other ABR delivery format. As used herein, a chunk refers to a discrete section of media content that can be independently decoded. Each chunk of media content can be stored in non-transitory memory structure as a separate file. A given chunk of content is typically referred to as a segment or fragment.

In the example of FIG. 1, a reconciliation engine 12 is configured to access storage 14 that can store a plurality of manifests 16 demonstrated as manifest 1 through manifest N, where N is a positive integer denoting the number of manifests. The reconciliation engine 12 can be configured to evaluate one or more of the manifest files 16. Based on such evaluation, the reconciliation engine 12 can determine a condition of a given chunk of media content to which the manifest entry refers and employ the manifest information to perform a reconciliation of redundant copies of ABR content without requiring evaluation of the chunks of media content.

In the examples described herein below, the number N of manifests is greater than or equal to two. Each manifest 16 can be stored as a respective manifest file in the storage 14. The storage 14 can include any number of non-transitory machine readable memory devices, which may reside at a single storage location or the storage 14 can be a distributed storage system (e.g., a content server farm). In either example, whether the manifests 16 are stored locally or distributed, each of the manifests 16 can represent a redundant copy of an ABR package of media content that includes a sequence of chunks for a given media asset. Each manifest 16 further can reference chunks of media content that are generated for any number of one or more bitrates according to an ABR profile employed for producing each ABR package for the media asset.

As an example, one manifest (e.g., Manifest 1) 16 can reference a copy of a media asset generated for a copy of a media asset use in one geographical (or other logical) area (e.g., an east coast storage facility) of a content delivery system. Another manifest (e.g., Manifest 2) 16 can reference another copy of the same media asset generated for use in another different geographical (or other logical) area (e.g., a west coast storage facility). Each manifest 16 includes a plurality of manifest entries 18 demonstrated in the example of FIG. 1 as entry 1 through entry P, where P is a positive integer denoting the number of entries in a given manifest 16. Since each of the manifest 16 has been generated to provide reference a respective copy a given media asset, each of the manifests 16 includes the same number of P entries that specify redundant chunks of media content.

In a steady state condition where no errors have occurred associated with the production of chunks corresponding to the given media asset, each of the entries 18 in each respective manifest 16 should refer to identical chunks of media content. In many examples, in the steady state, the entries in each manifest will be identical. Thus, in the steady state condition, media content from one region can be substituted for use in other region (e.g., as a backup) in the event that such content is for some reason not available locally for streaming from the primary source. Content may become unavailable for streaming from a primary source, for example, if equipment in a production pipeline fails or network transport breaks down.

As a further example, the manifest 16 can be an XML document that is stored in memory of storage 14 as a file that represents packetized chunks that form a single piece of media, for example, a video program. The manifest 16 can be generated as part of real-time streaming for the video program or as part of a recording of the video program for later streaming. The video program might have multiple variations (e.g. related instances of the video with different bit rates, localized content, etc.), but a single manifest file would not encapsulate more than that one presentation of a given media asset. Each entry in the manifest references a respective chunk of media content by specifying a media URI (uniform resource identifier) and associated attributes that apply to it. Attributes can include information describing a duration, encryption method, timestamp, and the like for a presentation of each chunk of media content for the media asset. The manifest can also include a sequence number tag to identify a group of one or more entries as part of a sequence of media chunks that form a presentation of a respective media asset.

When each manifest 16 is generated, the manifest generator (see, e.g., FIG. 2) also associates metadata 20 with each respective manifest entry 18. The metadata provides information that describes a condition of a given chunk of media content to which the entry 18 refers. For example, the metadata 20 can be implemented as a tag or field of a given manifest entry 18 that can specify whether or not the given chunk of media content, which can be stored along with the manifest files 16 in the storage 14 or in another location, is damaged or undamaged. As used herein, the term "damage" is intended to encompass that the metadata can indicate an error in the chunk of content, indicate that a portion of the chunk of content is missing or indicate that the entire chunk is missing. Additionally, if a given chunk is damaged, the metadata 20 can also indicate its relative damage.

For example, the metadata 20 can specify a wellness score associated with one or more part of production of a given chunk of media content. The wellness score provided by the metadata 20 can enable the reconciliation engine to identify and select one of a plurality of manifest entries that is associated with a more reliable copy of a given chunk of media content. In this example, a more reliable chunk of media content would exhibit less adverse impact on a user experience if the given chunk was delivered to the user during playout. The metadata can also include the attributes mentioned above.

As an example, where a given chunk of media content is determined to be damaged, the corresponding entry 18 in the manifest file 16 can be implemented as a placeholder entry. The placeholder entry can be generated according to the same well-defined schema that is used for generation of an original manifest entry and include corresponding attributes to reference and represent a corresponding chunk of media content. The placeholder entry can also include corresponding metadata, such as described above. For instance the metadata can identify the entry as a placeholder entry and further can specify whether the corresponding chunk of media content is missing or damaged. If the corresponding given chunk of media content is damaged, the metadata 20 can further specify the extent of the damage such as to provide an indication of the impact on the N user experience. The extent of the damage, for example, can be provided in a wellness score of a manifest entry associated with a given chunk of media content.

A damaged or missing chunk of media content can result from an error or failure in part of a respective media production pipeline, such as can include transcoding, packaging and/or transport. As disclosed herein, each of the redundant manifests 16 thus can be generated based on production via a different redundant pipeline. Since the production pipelines tend to be independent, there is an increased likelihood that at least one of the redundant copies of media chunks being produced and referenced by each manifest will be unaffected by an error or failure in another production pipeline.

In the example of FIG. 1, the reconciliation engine 12 can include detector 22 that is configured to determine whether the given chunk of media content is damaged based on the evaluation of the metadata 20 in the respective manifest entry 18. If the metadata indicates that an error might exist in a manifest entry 18, such as by specifying the manifest entry as a placeholder entry, the reconciliation engine 12 can retrieve a redundant copy of the manifest from the storage 14. The reconciliation engine 12 further can be programmed to compare corresponding entries (e.g., entries having the same sequence numbers) in the redundant manifests that have been retrieved. If the entry in another manifest does not include metadata indicating the corresponding chunk is damaged (e.g., incorrect data or missing), the reconciliation engine 12 can tag the entry in the second manifest for replacing the entry in first manifest. In some examples the reconciliation engine 12 may be implemented as a global process that is applied equally to each of the manifests 16 generated for reconciling redundant copies. In other examples, an instance of the reconciliation engine 12 can be implemented locally to process and repair a local redundant copy of the media content based on entries 18 in one or more other manifests 16.

In examples where the metadata 20 includes an indication as to the extent of the damage of the given chunk of the media content (e.g., a wellness score) or that the given chunk of media content is missing, the detector 22 can ascertain an extent of the damage to the given chunk of media content. In response to detecting that a given chunk of media content is damaged and/or the extent of such damage based on the metadata 20, the reconciliation engine 12 can access the storage 14 to locate an entry 18 in another manifest file 16 that is associated with a redundant copy of the same chunk of media content. The reconciliation engine 12 further can evaluate the metadata 20 associated with the entry in such other manifest 16 to select which entry 18 to utilize for reconciling the given chunk of media content. For example, the reconciliation engine 12 can copy the selected manifest entry 18 based on the evaluation of corresponding metadata in each manifest entry so that the copied manifest entry reference the same sequence number of media content to help maintain alignment and synchronization of manifest entries.

In some examples, the reconciliation engine 12 can determine that the other copy of a corresponding manifest entry is also damaged based on evaluation of its metadata 20. If all copies of a manifest entry for a given chunk of media content are damaged, then the reconciliation engine 12 can employ rules to determine how to proceed. For example, if the reconciliation engine 12 determines that the entry 18 in the local manifest 16 (e.g., manifest 1) references a more reliable copy than the entry in the other manifest file (manifest N), the reconciliation engine 12 can keep or retain the original entry 18, such as by copying it back into the local manifest. In some examples, the reconciliation engine 12 can also copy the local manifest entry into the other manifest 16 that is determined to be less reliable, thereby reconciling the plurality of manifests that reference redundant chunks of media content.

The reconciliation engine 12 can also be programmed to reconcile chunks at one or more stages of production and/or at playout, such as disclosed herein (see, e.g., FIGS. 3-6). As an example, the reconciliation engine 12 can access the storage 14 to continually or intermittently monitor each of the manifests for changes. The reconciliation engine 12 can perform the reconciliation with respect to one or more (e.g., each) of the plurality of bitrates generated according to a corresponding ABR profile. Additionally or alternatively, the reconciliation engine 12 can monitor for requests for a given manifest associated with a request for ABR content and perform reconciliation of redundant content based on the evaluation of manifest entries for such requested content.

The reconciliation engine can include a manifest modification function 24 configured to modify a given manifest entry 18 (e.g., in manifest 1) with a selected manifest entry from the other manifest file (e.g., manifest N) that was identified by the reconciliation engine 12. The manifest modification function 24 can be code operating in or invoked by the reconciliation engine programmed to modify the manifest entry. In some examples, the manifest modification function 24 can modify one or more manifest entry 18 to reference other content 28 that may be different from the originally intended chunk of media content. For example, the other content 28 can include an ad or other content that can be substituted for the originally intended chunk, such that the entry 18 in the manifest 16 can be modified to reference a selected substitute ad reference. In other examples, the manifest modification function 24 can modify the manifest entry to reference other predetermined content that can cause such content to replace the chunk. Additionally or alternatively, the entry can be modified to reference other content, such as an overlay, that can be provided in addition to a chunk that has been determined to be damaged as disclosed herein. For instance, the overlay may be provided to specify technical difficulties associated with a given chunk of media content.

As yet another example, the reconciliation engine 12 can locate a replacement chunk in a different and undamaged profile for the same service (e.g., a real-time streaming media channel). For instance, the reconciliation engine 12 can search the local manifest (e.g., manifest 1) to locate a repair candidate entry at a different bit rate. The manifest modification function 24 can modify a given manifest entry 18 to specify a chunk of media content at a different (e.g., lower) bitrate than the originally referenced chunk, which can be substituted based on the information provided in modified manifest entry during playout. The reconciliation engine 12 can further take into account any skew between the time windows between the chunk being examined, and the chunk used for repair. If skew exists, the reconciliation engine 12 can delay a decision (e.g. stall the playlist) temporarily, until an alternate chunk is determined to be available.

In some examples, the reconciliation engine 12 can be configured to trigger a re-creation or re-production of the given chunk of media content if the evaluation of manifest entries 18 for redundant copies of the corresponding chunk of media content does not result in a suitable chunk being identified. The reconciliation engine 12 can trigger the recreation by sending instructions to one or more production pipeline, which instructions can include or be derived from attributes specified in the manifest entry for the given chunk of media content. The attributes and URI for the resulting recreated chunk that is produced can be employed by the manifest modification function 24 to modify the entry 18 to reference the recreated chunk for playout. While this approach may not be practical for real-time streaming of ABR content, it can be implemented if the chunks of ABR media content are being generated and recorded in the storage 14 for subsequent playout.

The reconciliation engine 12 can reside at a location within the media delivery system to facilitate taking action to repair damaged or missing ABR content. As an example, the manifest modification function 24 and the reconciliation engine 12 can be located within the production pipeline. For instance, the reconciliation engine 12 can be located within a packager, a transcoder, or be distributed across a transcoder and a packager. In other examples, the reconciliation engine 12 can be implemented as a service that is separate from the media production pipeline in ABR streaming system, such as can operate directly on or within the storage 14. As another example, the reconciliation engine 12 can be implemented in an origin server. Thus, the reconciliation engine 12 can be implemented in one or more locations in the media content delivery system to enhance user experience.

As a further example, the reconciliation engine 12 can be located before the package experiences fan-out to downstream functions. As an example, the reconciliation engine 12 may reside within the packager itself. As another example, it can operate directly from a publishing point or immediate storage such as the storage 14. As yet another example, the reconciliation engine 12 could be implemented in each ABR client, such as by supplying each such client with multiple manifests for referencing redundant copies of media content and requesting content based on reconciling locally at the client which manifest entry references more reliable content. While the manifest modification function 24 is demonstrated as residing in the reconciliation engine 12, the manifest modification function could, in other examples, be separate from the reconciliation engine. In some examples, the reconciliation engine 12, including the detector 22 and the manifest modification function 24, could be implemented to reside in a manifest manipulator located at one or more places within a content delivery system.

As disclosed herein, the reconciliation engine 12 can effectively repair damaged or missing content in an ABR media delivery system implementing redundant production pipelines. The reconciliation engine 12 can perform reconciliation of redundant content via manifest manipulation, without requiring retrieval or parsing of corresponding chunks of media content. Moreover, the manifest modification function 24 can implement the repair (as instructed by the reconciliation engine 12) without requiring any changes to the chunks of ABR media content. As a result of such manifest manipulation to reference reliable chunks of media content, downstream entities (e.g. recorders, origin playout nodes, cache nodes, and end clients) can seamlessly retrieve the appropriate alternate content based on the reference to such chunk in the modified version of the first manifest. Accordingly, time and processing resources to perform such reconciliation can be less expensive as compared to performing content-based analysis and repair.

In some examples, the reconciliation engine 12 can be programmed to intermittently read the manifest and evaluate the entries to identify one or more damaged chunks of ABR content. As mentioned, such entries are identified based on metadata (e.g., attributes or other tags) that are provided to identify damaged (e.g., imperfect or missing) content. The reconciliation engine 12 can allow a manifest referencing the original content to propagate to downstream clients if no damage is identified based on the evaluation of metadata. However, if the reconciliation engine 12 detects metadata identifying one or more damaged (e.g., incorrect or missing) chunks of content, the reconciliation engine 12 can employ the manifest modification function 24 to take action to repair the problem as disclosed herein.

Figure 2:
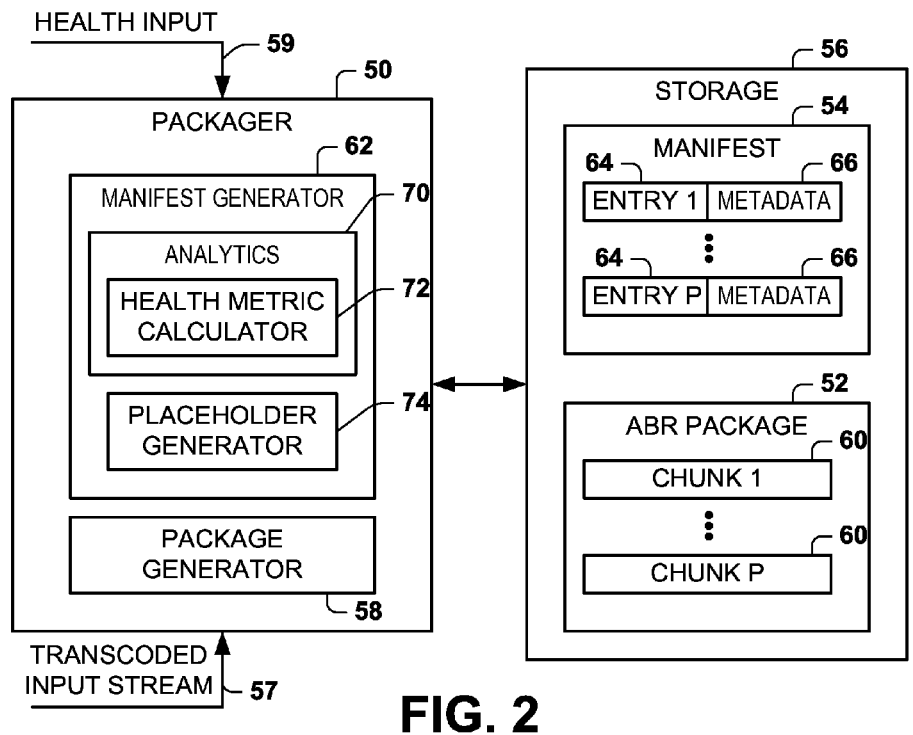
FIG. 2 illustrates an example of part of a media production pipeline including a packager.

FIG. 2 depicts an example of part of a production pipeline that includes a packager 50 configured to produce an ABR package 52 and a corresponding manifest file 54 that can be placed in corresponding storage 56. The storage 56 can correspond to storage 14 of FIG. 1 and the manifest 54 can correspond to the manifest 16 of FIG. 1. The packager 50 may also be referred to as a fragmenter, encapsulator, or segmentor, which terminology has been used interchangeably in the industry to represent this same function. Additionally, as disclosed herein, the storage 56 can be at a given storage location or the storage may be distributed such that the manifest and ABR package can reside at different locations or devices. The storage 56 can store recorded media content for later playout or the media content can be generated for real-time streaming of such media content, such as in response to a request for playout of a given media asset.

The packager 50 is configured to generate the manifest 54 and the ABR package 52 based on a transcoded input stream 57 such as can be provided from an upstream transcode stage. For example, an upstream transcode stage can include one or more transcoders configured to transcode input content that is provided from a content source to a desired bitrate and resolution. The transcode stage can include any number of transcoders that can provide a transcoded input stream to the packager 50 according to an ABR profile that specifies the bitrates and other attributes of the transcoded streams. For example, the transcoded input streams 57 can be provided as a conditioned continuous group of elementary streams.

The packager 50 includes a package generator 58 that is configured to generate the ABR package 52 by segmenting the transcoded input streams 57 into respective chunks 60 of media content. For example, the package generator 58 processes the transcoded input streams to create one or more ABR packages 52 that include chunks 60 of mixed or separated elementary streams. Each of the chunks 60 can be stored as a respective file in the storage 56, which file is wrapped in one or more ABR formats. The file size for each chunk can be a fixed size or such chunks can be generated to be within a predetermined maximum size. In the example of FIG. 2, the ABR package 52 includes chunk 1 through chunk P, where P is a positive integer denoting the number of chunks into which the package generator 58 encapsulated the transcoded input streams 57 for a given media asset.

The packager 50 also includes a manifest generator 62 that is configured to generate a manifest 54 associated with the ABR package 52. The manifest generator 62 can generate the manifest as a playlist that specifies corresponding entries for each of the respective chunks 60. Thus, each entry 64 in the manifest 54 is associated with and references a corresponding chunk 60 in the ABR package 52. By way of example, the manifest 54 can be implemented as a text file, such as can be a well-formed XML document or other text document based on an ABR-format-specified schema (e.g., having a predefined structure and syntax). Each entry 64 can include a plurality of attributes that characterize features of the each respective chunk 60 to which it refers, such as can include tags to specify a URI, codec, bitrate, duration, time stamp and the like for each respective chunk. The attributes for a given manifest entry 64 can vary according to ABR format. Each entry does not include a respective sequence number. Instead, the manifest 54 can include a sequence number that specifies a start sequence number that implies a range sequence numbers for each of the respective entries in the manifest.

The manifest generator 62 can also associate metadata 66 with each respective entry 64. The metadata 66, for example, can be implemented as a reconciliation attribute of the entry that specifies a condition of the chunk that is referenced by each respective entry 64. As disclosed herein, the metadata 66 associated with a given manifest entry 64 can indicate whether or not a given chunk 60 is damaged or undamaged. In some examples, the metadata 66 can also indicate a relative wellness of each respective chunk by specifying an extent of damage to the chunk (e.g., provided as a wellness value, such as a score). For example the relative wellness value can specify an expected impact that the identified damage would have on a user experience during playback of the given media asset.

By way of example, the manifest generator 62 can include analytics 70 to evaluate production for a given chunk generated by the packager 50. The analytics 70 can evaluate one or more parts of a media production pipeline of which the packager 50 is part to determine damage of a given chunk. The analytics 70 can perform the evaluation based on processing performed internally by the packager or based on information provided externally, such as from another part of the production pipeline (e.g., from a transcode stage) and/or based on another health input 59. For instance, the health input 59 can be provided by an external evaluation component (e.g., dedicated diagnostic hardware and/or software service) configured to monitor and evaluate one or more parts of the media production pipeline and/or chunks of media content that it produces and provide health data specifying detected errors. Additionally or alternatively, the health input 59 can be provided by a transcode stage of the corresponding pipeline to specify an error or failure in the transcode process that produces a stream used to generate one or more chunks. In other examples, the transcoded input stream 57 can include information specifying transcoding errors that can be utilized by the analytics 70 to ascertain whether or not a given chunk is damaged and, in some examples, the extent of such damage. The errors can be linked to one or more chunks being generated by the packager based on implicit or explicit information. For example, the analytics 70 can examine the input stream 57 to determine that one or more error condition exists (e.g. timestamps or continuity counters indicate a problem with the arriving stream). Additionally or alternatively, the health input 59 (e.g. from the transcoder or other upstream device) can provide explicit information specifying damage. The analytics 70 thus can determine that a given chunk is damaged based on analysis of the packaging process, including analysis of the input stream 57, internal evaluation of the packaging process and/or externally provided explicit information (e.g., health input 59). The manifest generator 62 can insert corresponding metadata 66 to each entry based on the analytics 70.

In some examples, the analytics 70 can include a health metric calculator 72 that is configured to compute a wellness metric having a value indicative of the damage for a given chunk of media content. For instance, the value of the wellness metric can specify whether or not a given chunk 60 is damaged and, if damaged, an extent of such damage. As mentioned, the extent of damage can be based on an expected impact the damage to a given chunk would have on a user experience during playout of the given media asset. The health metric calculator 72 can determine the extent of such damage for a given chunk of media content based on analysis of the packaging process for generating the given chunk, based on the transcoded input stream 57 and/or based on the health input 59 that is provided to the packager 50. The analytics 70 thus can employ the health input and/or the health metric computed by the calculator 72 to ascertain a wellness value, which the manifest generator can provide in the metadata 66 that is associated with a corresponding manifest entry 64 for a given chunk 60 of media content.

In some examples, the manifest generator 62 can include a placeholder generator 74. The placeholder generator 74 can be configured to preserve sequence number alignment across redundant copies of media content even if one or more of such copies may contain a damaged or missing chunk. The use of a placeholder for a manifest entry 64 is contrary to the requirements of some ABR formats, such as the HLS specification. The placeholder generator 74 can be configured to generate a placeholder entry in the respective manifest file 54 for referencing a given chunk of media content in response to determining that the given chunk of media content is damaged or missing. The placeholder generator 74 can construct the respective manifest entry 64 according to the same specification (e.g., a well-formed XML schema) that each other manifest entry in the manifest 54 is constructed.

As an example, the placeholder generator 74 can generate a given placeholder entry that is stored in the manifest 65 as a respective entry 64 to preserve a corresponding sequence number of a given chunk of media content referenced in the manifest even if no corresponding chunk 60 exists or a damaged chunk is stored in the ABR package 52. In this way, the corresponding manifest can remain synchronized with the media content that would exist in a redundant copy that is generated by another pipeline. Additionally, the placeholder generator 74 can tag the placeholder manifest entry 64 with corresponding metadata that can be utilized to alert a reconciliation engine (e.g., engine 22 of FIG. 1) that the identified chunk is either damaged or missing. As disclosed herein, the metadata 66 can be a simple binary attribute to indicate that the chunk is missing or damaged. In other examples, the metadata 66 can provide an indication of the extent of such damage to enable a more granular form of reconciliation. For example, the downstream reconciliation engine can employ the metadata to ascertain a degree of impact if the chunk (or absence of chunk) were delivered as part of an ABR stream.

As used herein, a placeholder manifest entry does not refer to any particular deficiency in the content of the manifest entry. For example, in order to enable processing by the reconciliation engine (e.g., reconciliation engine 12 of FIG. 1) the content of a placeholder entry, including each of the attributes relating to an associated chunk for which the placeholder entry is generated, can be included in the placeholder to the extent such information is available. For example, the attributes of a given placeholder entry can specify a URI, codec, bitrate, duration, time stamp and the like for each respective chunk. The attributes for a given manifest entry 64 can vary according to ABR format. In a situation where the analytics 70 determine that a corresponding chunk is undamaged, the placeholder generator 74 may not generate a placeholder but instead, the manifest generator 62 can employ normal rules to generate the manifest entry in the normal manner to enable downstream access and processing of the given chunk of media content. If the analytics 70 determine that a corresponding chunk is damaged, the placeholder generator 74 can generate the placeholder entry with metadata identifying the chunk as damaged and, if supported, the extent of such damage. In this way, a reconciliation engine can evaluate the metadata and, in response to detecting damage, perform a reconciliation of the placeholder and a corresponding entry for a redundant copy of media content to repair and/or replace the damaged chunk with a more reliable redundant copy. While the implementation of a placeholder entry in the manifest may violate requirements for ABR formats, the use of placeholders can facilitate the reconciliation process as disclosed herein.

FIGS. 3, 4, 5 and 6 demonstrate examples of production pipelines and corresponding content delivery systems that can implement a reconciliation engine to enable reconciliation of redundant copies of ABR content. In each of these examples, the reconciliation engine can reside at a different location of the content delivery system to implement the functionality of the reconciliation engine 12 of FIG. 1. While each example demonstrates the reconciliation engine at a different location, a production pipeline, in other examples, can implement a reconciliation engine at more than one of such locations. Accordingly, reference can be made back to the example of FIG. 1 for additional context and functionality of the reconciliation engine. Additionally, as disclosed herein, each reconciliation engine can employ a manifest modification function to implement changes to a given manifest based on the reconciliation. The manifest modification function could be implemented as part of the reconciliation engine or it can be a separate component or service that can operate based on instructions from the reconciliation engine.

Figure 3:
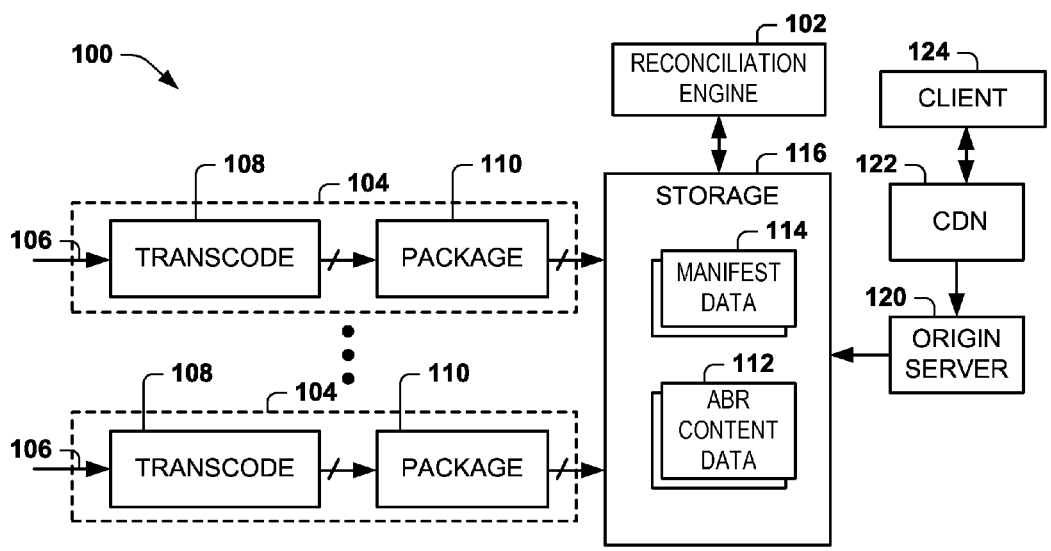
FIG. 3 illustrates an example of a media production pipeline that includes a reconciliation engine.

FIG. 3 depicts an example of a content delivery system 100 that can include a reconciliation engine 102 for reconciling redundant copies of ABR content. The system 100 includes a plurality of (e.g., two or more) content production pipeline 104. Each production pipeline 104 can be configured to generate ABR media content according to one or more ABR profiles. Each production pipeline 104 can receive media content from a source. The input media content is demonstrated at 106. In some examples, the source of the input media content 106 can be the same for each pipeline 104. In other examples, the source of the input media content 106 may be different. In situations where the source of the media content is different, the corresponding content, however, typically will be the same and synchronized. Each production pipeline 104 can include a transcode stage 108 that provides transcoded media of ABR content (e.g., one or more elementary streams) to a package stage 110. The transcode stage 108 can be configured to transcode or encode the input media content 106 to one or more bitrates according to a respective ABR profile. For example, the transcode stage can include a plurality of transcoders, each configured to convert a packetized elementary stream of one bitrate to one or more lower-bitrate streams by changing coding parameters, including media resolution. Each of the transcoded media streams can be provided to the package stage 110.

The package stage 110 can be implemented to provide the functionality disclosed with respect to the packager 50 of FIG. 2. Briefly stated, the package stage 110 is configured to generate corresponding ABR content data 112 for each respective stream provided by the transcode stage 108. The ABR content data 112 can include an ABR package for each of a plurality of different output streams. Each ABR package can include a plurality of media chunks that in sequence correspond to the transcoded media for a respective bitrate and resolution, for example. The package stage 110 can also include a manifest generator for generating corresponding manifest data 114 for each ABR package. The manifest thus can be a file generated according to the well-formed (e.g., XML) schema to enable access and playout of the ABR content data 112.

The manifest data 114 and ABR content data 112 for each respective pipeline 104 can be co-located in a common data storage 116. In other examples the redundant copies of ABR content data 112 and the manifest data generated for a given pipeline 104 can be stored separately and utilized independently for delivering content to one or more users. The storage 16 thus can correspond to the storage 14 of FIG. 1.

As disclosed herein, while both pipelines 104 can produce the same content for use by a respective set of downstream entities (e.g., CDN nodes, services, and users), the reconciliation engine 102 can be configured to modify the manifest data 114 that is generated for one or more of the pipelines based on the manifest data generated by another of the pipelines. For example, the reconciliation engine can intermittently read and reconcile manifest entries for multiple redundant pipelines. The reconciliation engine 102 can further modify a manifest entry for a chunk of media content (e.g., via a manifest modification function) with a corresponding manifest entry generated by another pipeline, such as to enable a more reliable chunk of media content to be accessed during playout. Additional functions and capabilities of the reconciliation engine 102 are disclosed herein (see, e.g., FIG. 1 and its corresponding description).

In the example of FIG. 3, the system 100 also includes one or more origin servers 120. As an example, the origin server 120 can be connected with one or more content delivery networks 122 to enable content delivery to end users, such as at one or more clients 124. Each of the clients 124 can issue requests to the content delivery network 122 to be fulfilled by the origin server 120. As mentioned, the storage 116 can include the manifest data 114 and ABR content data 112 to be disbursed for each pipeline at geographically disparate locations to facilitate access and delivery to the content across a corresponding geographic region. The manifest, which can be modified by a manifest modification function (e.g., manifest modification function 24 of FIG. 1), thus can be propagated to downstream entities including the Origin Server, CDN and ultimately to clients for requesting media content. Thus, in response to a client requesting content from the origin server 120 via the CDN 122, the system 100 can adapt delivery of the requested content at a bitrate and resolution based on client and network capabilities, for example. The bitrate and resolution can be modified during playout of the ABR media content 112 such as in a response to a change in network conditions or the capabilities of the client who requested the content. Since the reconciliation engine can effect repairs detected based on evaluation of metadata in a given manifest, requests for content based on the propagated manifests, which may have been repaired to reference undamaged or more reliable copies of redundant content, can eliminate or mitigate errors.

Figure 4:
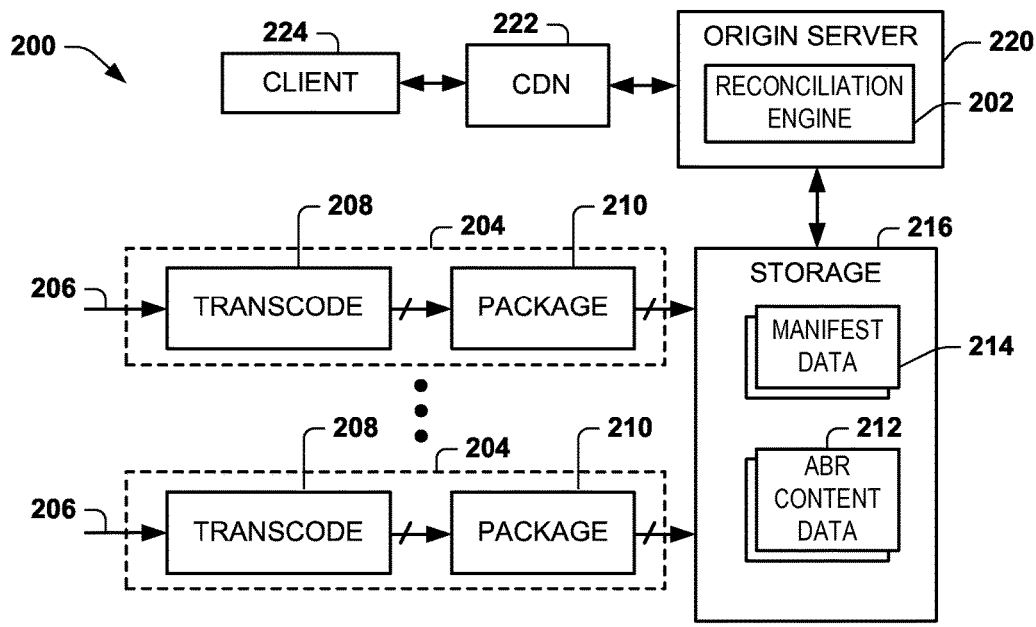
FIG. 4 illustrates another example of a media production pipeline that includes a reconciliation engine.

FIG. 4 depicts another example of a content delivery system 200 that can include a reconciliation engine 202 for reconciling redundant copies of ABR content. Reference numbers in the example of FIG. 4 increased by adding 100 to refer to identical components and functions introduced in the example system of FIG. 3. Accordingly, reference can be made back to FIG. 3 and appropriate other disclosures herein for additional context. In the example system in FIG. 4, the reconciliation engine is implemented in the origin server 220. There can be any number of one or more origin servers, each of which can access the storage 216 that contains the manifest data 214.

Additionally, the storage 216 can be implemented as a distributed storage system in which manifest data 214 and ABR content data 212 for the zone supported by the origin server 220 are generated by a local one of the pipelines 204 and stored locally. The manifest data 214 and ABR content data 212 can be stored remotely. In this way, the reconciliation engine 202 can be programmed to reconcile the local manifest data. For instance, so long as the local manifest data 214 does not indicate damaged ABR content (e.g., based on metadata or placeholder entries), the origin server 220 can process requests for such content without accessing the remote manifest data that is produced by another pipeline 204. If the reconciliation engine 202 determines that ABR content is damaged based on such evaluation, the reconciliation engine can access the manifest data 214 for one or more redundant copy of ABR content 212 for reconciliation, such as disclosed herein. For example, the reconciliation engine 302 can employ a manifest modification function (e.g., modification function 24 of FIG. 1) to modify the manifest data.

Figure 5:
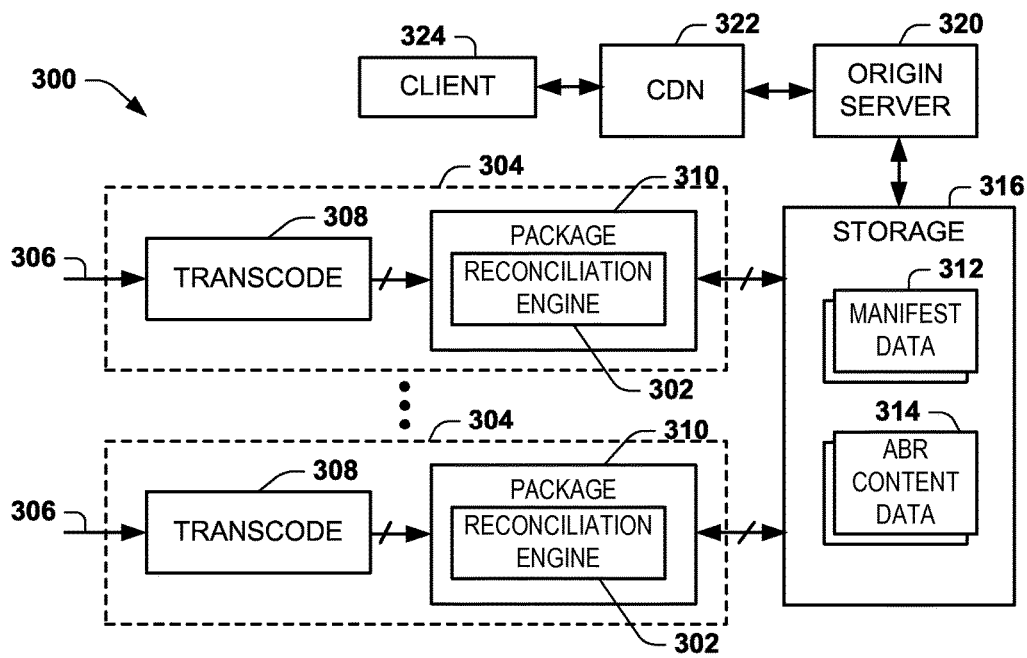
FIG. 5 illustrates yet another example of a media production pipeline that includes a reconciliation engine.

FIG. 5 depicts another example of a content delivery system 300 that can include a reconciliation engine 302 for reconciling redundant copies of ABR content. Identical reference numbers in the example of FIG. 5, increased by adding 200, refer to identical components and functions introduced in the example system 100 of FIG. 3. Accordingly, reference can be made back to FIG. 3 and appropriate other disclosures herein for additional information and context.

In the example system in FIG. 5, an instance of the reconciliation engine 302 is implemented in the package stage 310 of at least one redundant media production pipeline 304. As disclosed herein, there can by any number of two or more redundant media production pipelines. By implementing the reconciliation engine 302 as part of the package stage 310, efficiencies can be achieved. For instance, the reconciliation engine (e.g., reconciliation engine 12 of FIG. 1) of the reconciliation engine 302 can be configured to monitor manifest files produced by a manifest generator (e.g., manifest generator 62 of FIG. 2) of a given production pipeline, such as in real-time production thereof. In response to determining that a given chunk of media content is damaged, based on monitoring of the manifest file being generated, the reconciliation engine 302 can employ a manifest modification function (e.g., manifest modification function 24 of FIG. 1) to modify the manifest data to reference an undamaged or more reliable chunk of data. modify the manifest data that is being generated to reference an undamaged or more reliable chunk of data.

In some examples, as shown in FIG. 5, each redundant package stage 310 can include a reconciliation engine to reconcile redundant ABR content. For example, a given package stage 310, in response to its reconciliation engine 302 monitoring manifest files that are generated and detecting damage to ABR content, can coordinate reconciliation of redundant ABR content data 314 with one or more of the other package stages 310.

Figure 6:
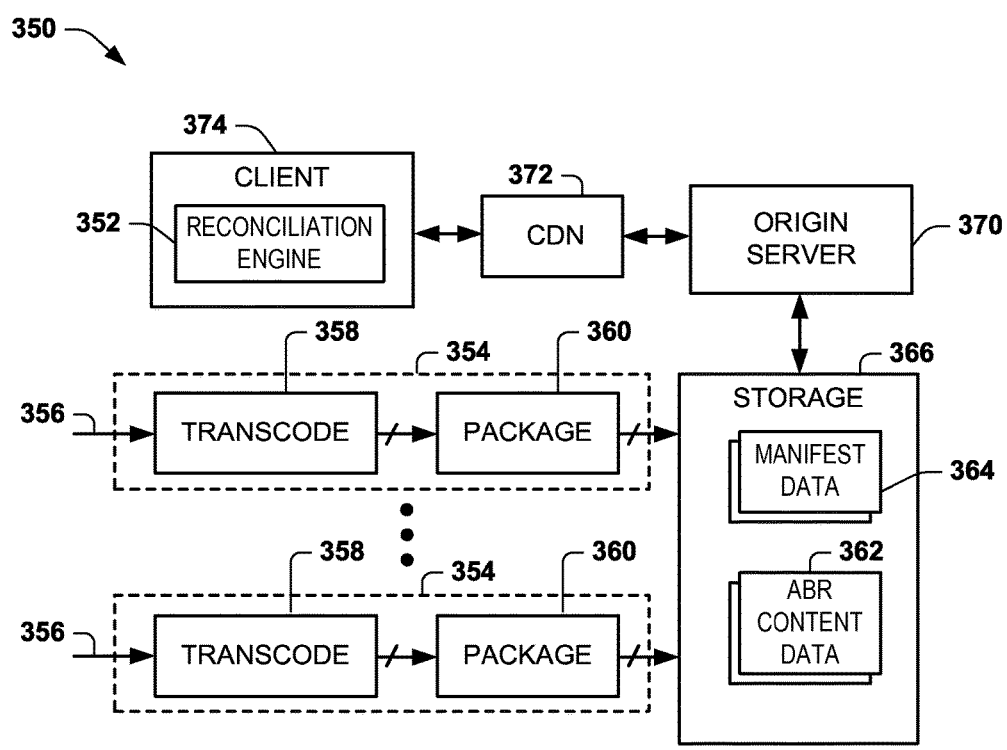
FIG. 6 illustrates yet another example of a media production pipeline that includes a reconciliation engine.

FIG. 6 depicts another example of a content delivery system 350 that can include a reconciliation engine 352 for reconciling redundant copies of ABR content. Identical reference numbers in the example of FIG. 6, increased by adding 250, refer to identical components and functions introduced in the example system 100 of FIG. 3. Accordingly, reference can be made back to FIG. 3 and appropriate other disclosures herein for additional information and context.

In the example system in FIG. 6, an instance of the reconciliation engine 352 is implemented in one or more clients 374 of the system 350. Depending on capacity, there can by any number of clients, each of which can implement a reconciliation engine 352. The reconciliation engine 352 can evaluate entries in a manifest that it receives in response to a request for receiving streaming media content, for example. In response to determining that a given chunk of media content is damaged, based on its monitoring of the manifest file, the reconciliation engine 302 can employ a manifest modification function (e.g., manifest modification function 24 of FIG. 1) to modify the manifest data to reference an undamaged or more reliable chunk of content data. In some examples, the client 374 can receive an updated (e.g., replacement manifest) or it can receive updated entries to reference undamaged chunks of content that can be requested by the client.

Figure 7:
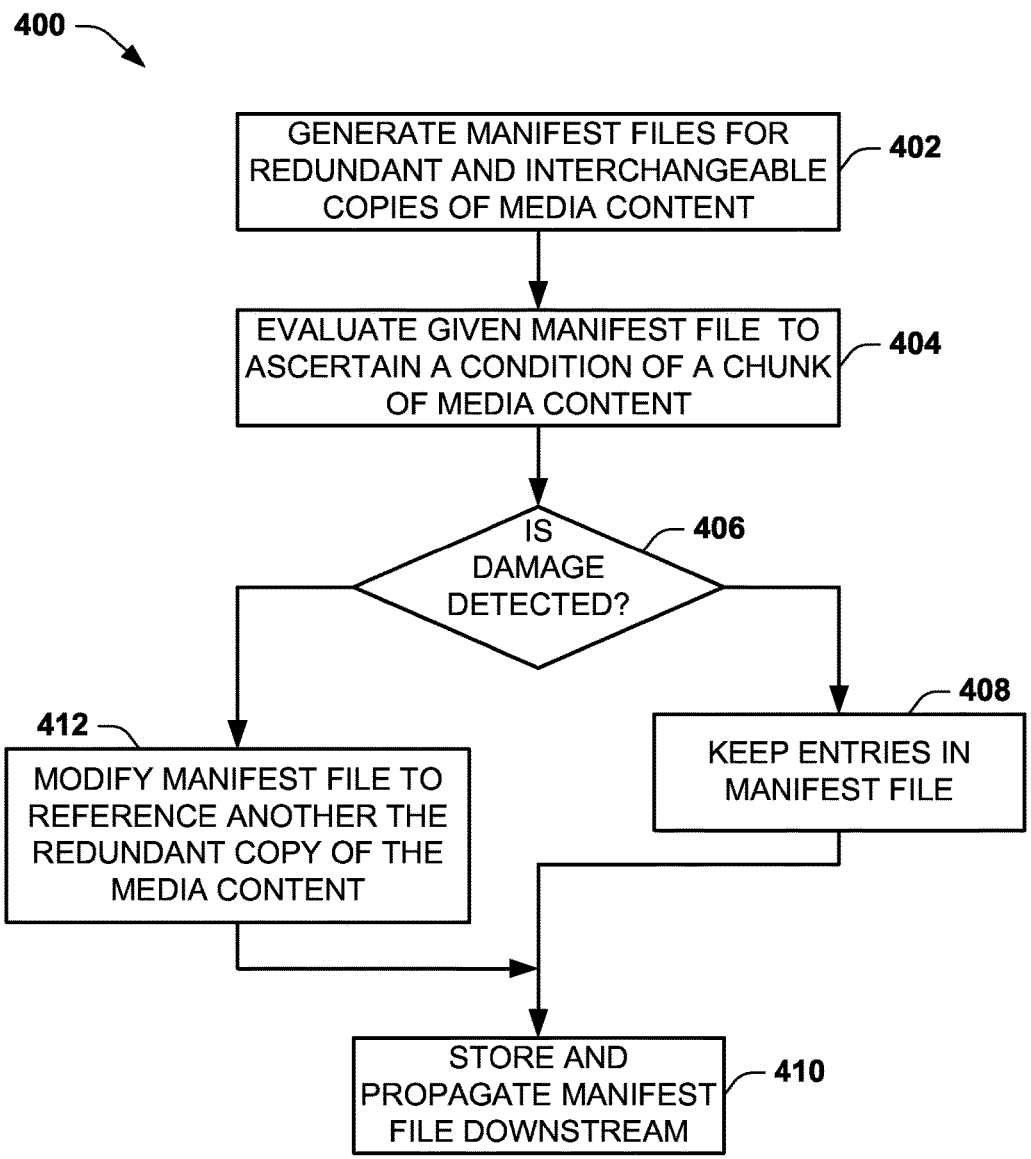
FIG. 7 is a flow diagram demonstrating an example method for reconciling redundant copies of media content.

In view of the foregoing structural and functional features described above, methods that can be implemented will be better appreciated with reference to FIG. 7. While, for purposes of simplicity of explanation, the method of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect of the present invention. The methods or portions thereof can be implemented as instructions stored in a non-transitory storage medium as well as be executed by a processor of a computer device or special purpose media distribution device (e.g., a digital content manager), for example.

FIG. 7 illustrates an example of a method 400 for reconciling redundant copies of media content. The method 400 includes, at 402, storing a plurality of manifest files for redundant and interchangeable copies of media content for a given media asset. Each of the manifest files can be generated (e.g., by manifest generator 62 of packager 50 of FIG. 2) for each of a plurality of redundant media productions pipelines. The manifest files can be fixed upon production or they may be updated and revised during production and packaging of chunks of media content for a given media asset.

In some examples, the manifest files generated at 402 can include metadata associated with respective manifest entries to specify a condition of the given chunk of the media content. The condition, for example, can indicate whether a given chunk of content is damaged or undamaged. As disclosed herein, in some examples, when manifest entries are generated for respective chunks of media content, a placeholder entry can be generated (e.g., by placeholder generator 74 of manifest generator 62 of FIG. 2) for a corresponding entry in the respective manifest file, such as disclosed herein. The placeholder entry can be generated for referencing the chunk of media content in response to determining that the given chuck is damaged. The placeholder entry can include metadata indicating that the given chunk is damaged. Additionally, if the chunk is damaged, the metadata can include a computed value that specifies a relative extent of the damage to the given chunk of media content.

At 404, one or more given manifest file can be evaluated (e.g., by reconciliation engine 12 of FIG. 1) to ascertain a condition of a discrete section (e.g., given chunk) of a corresponding copy of the media content. The evaluation at 404 can be performed based on the metadata associated with each manifest entry. For example, at 406, the evaluation can be used to detect (e.g., by detector 22 of reconciliation engine 12) if the corresponding copy of the given chunk is damaged or not damaged. Additionally, if metadata specifies an extent of damage for the given chunk, the evaluation at 404 can be applied to multiple manifest entries for redundant copies of the given media chunk to determine which of the redundant copies is more reliable (e.g., less damaged).

If the determination at 406 indicates that no damage is detected, the method can proceed to 408. At 408, the manifest entry that was evaluated and determined to be undamaged can be kept in the manifest file. The manifest file can then be stored and propagated downstream, at 410, such as for use in controlling adaptive delivery of the media content.

If the determination at 406 indicates that damage is detected, the method can proceed to 412 and given manifest file can be modified (e.g., by manifest modification function 24 of FIG. 1) to reference another of the redundant copies of the media content. For example, the modification at 412 can include modifying a given entry of the given manifest file based on the evaluation indicating that the discrete section of the media content in the corresponding copy of the media content is damaged. Additionally, where the metadata includes a relative indication of damage or an indication whether the given chunk is missing or present but damaged, the modification at 412 can include comparing such metadata to determine which manifest entry references a more reliable copy of the given chunk of media content, which can be used to modify the entry or if the original entry is more reliable it can be kept. From 412 the method can proceed to 410, where the modified manifest file can be stored into storage and propagated downstream.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A content delivery system comprising:
    a reconciliation engine configured to evaluate a given manifest file of a plurality of manifest files generated for redundant copies of a given media asset and detect that a given chunk of media content for a given redundant copy is damaged, the given manifest file comprising a plurality of entries referencing a plurality of chunks of media content of the given redundant copy, wherein each of the pluralities of entries comprises metadata describing a condition of a corresponding chunk of media content in the given redundant copy of the given media asset, wherein the reconciliation engine comprises a placeholder generator configured to generate a placeholder entry in the given manifest file for referencing the given chunk of media content in response to the reconciliation engine detecting that the given chunk of media content is damaged, and wherein the placeholder entry comprises corresponding metadata identifying the given chunk of media content as damaged, the corresponding metadata comprising a wellness score indicating a relative extent of the damage, the wellness score further indicating impact of the damage on an user experience during playback of the given chunk of the media content;
    a manifest modification function computer device configured to modify the given manifest file in response to detecting that the given chunk of media content is damaged, wherein the manifest modification function computer device being configured to modify the given manifest file comprises the manifest modification function computer device configured to:
        retrieve another manifest file corresponding to another redundant copy of the given media asset,
        locate a corresponding manifest entry in the another manifest file that is associated with another copy of the given chunk of media content,
        modify the placeholder entry in the given manifest file to reference to the corresponding manifest entry in the another manifest file, and
        propagate the modified given manifest file to users of the content delivery system; and
    a plurality of packagers, each residing in a respective media production pipeline and configured to generate the plurality of manifest files for the redundant copies of the given media asset, the reconciliation engine to evaluate at least two of the plurality of manifest files generated by at least two of the packagers wherein each of the plurality of packagers further comprises a manifest generator to generate a respective manifest file for the redundant copies of the given media asset, the manifest generator further configured to produce the metadata associated with a manifest entry referencing each respective chunk of media content generated for the given media asset wherein each manifest generator further comprises analytics to compute the wellness score specifying the relative extent of the damage to the given chunk of media content, the reconciliation engine to compare the computed wellness score for the given chunk of media content from the plurality of manifest files to select the corresponding manifest entry to be stored in the given manifest file for referencing a more reliable copy of the given chunk of media content wherein the more reliable copy of the given chunk of media content provides a less adverse impact on a user experience than the given chunk of media content.

2. The content delivery system of claim 1, wherein each of the plurality of manifest files for the redundant copies of the given media asset are generated via the separate media production pipelines to reference interchangeable chunks of media content for the given media asset.

3. The content delivery system of claim 1, wherein the reconciliation engine is further configured to employ the placeholder entry to locate the corresponding manifest entry in the another manifest file of the plurality of manifest files referencing another copy of the given chunk of media content.

4. The content delivery system of claim 2, further comprising a transcode stage associated with each respective media production pipeline, each transcode stage being configured to transcode a source input corresponding to the given media asset to at least one selected bitrate according to an adaptive delivery profile.

5. The content delivery system of claim 1, wherein the reconciliation engine is further configured to:
    employ the placeholder entry to locate the corresponding manifest entry in the another manifest file of the plurality of manifest files referencing the another copy of the given chunk of media content; and
    replace the placeholder entry in the given manifest file with the corresponding manifest entry from the other manifest file if the corresponding manifest entry is determined to reference the more reliable copy of the given chunk of media content.

6. A method comprising:
    generating a plurality of manifest files for redundant and interchangeable copies of media content for a given media asset;
    evaluating a given manifest file of the plurality of manifest files to ascertain a condition of a discrete section of media content in a given redundant copy;

detecting that the discrete section of media content for the given redundant copy is damaged, the given manifest file comprising a plurality of entries referencing a plurality of discrete sections of media content of the given redundant copy, wherein each of the pluralities of entries comprises metadata describing a condition of a corresponding discrete section of media content in the redundant copy;

generating a placeholder entry in the given manifest file for referencing the discrete section of media content in response to detecting that the discrete section of media content is damaged, wherein the placeholder entry comprises corresponding metadata identifying the discrete section of media content as damaged, the corresponding metadata comprising a wellness score indicating a relative extent of the damage, the wellness score further indicating impact of the damage on an user experience during playback of the given chunk of the media content, wherein the discrete section of the media content comprises a given chunk of media content, wherein generating the plurality of manifest files further comprises associating the metadata with manifest entries in the plurality of manifest files to specify the condition of the discrete section of media content, wherein the discrete section of the media content comprises a given chunk of media content, wherein generating the plurality of manifest files further comprises associating the metadata with manifest entries in the plurality of manifest files to specify the condition of the discrete section of media content; and modifying, by a manifest modification function computer device, the given manifest file to reference the discrete section of media content in another of the redundant and interchangeable copies of the media content based on the evaluation indicating that the discrete section of media content in the given redundant copy of the media content is damaged, wherein modifying the given manifest file comprises:

retrieving another manifest file corresponding to another redundant copy of the given media asset, locating a corresponding manifest entry in the another manifest file that is associated with another copy of the discrete section of media content, modifying the placeholder entry in the given manifest file to reference to the corresponding manifest entry in the another manifest file, and propagate the modified given manifest file to users of the content delivery system; and comparing the wellness score for the discrete section of media content from the plurality of manifest files to select the corresponding manifest entry to be stored in the given manifest file for referencing a more reliable copy of the discrete section of media content wherein the more reliable copy of the given chunk of media content provides a less adverse impact on a user experience than the given chunk of media content.

7. The method of claim 6, further comprising:

replacing the placeholder entry in the given manifest file with the corresponding manifest entry from the another manifest file if the corresponding manifest entry is determined to reference the more reliable copy of the discrete section of the media content.

8. The content distribution system of claim 1, wherein the manifest modification function computer device being configured to locate the corresponding manifest entry comprises the manifest modification function computer device configured to:

retrieve a plurality of corresponding manifest entries in the plurality of manifest files, each of the plurality of corresponding entries corresponding to the corresponding redundant copy of the given chunk of media content;

compare the metadata associated with the plurality of corresponding manifest entries; and locate the corresponding manifest entry from the plurality of corresponding manifest entries based on the comparison.

9. The content distribution system of claim 8, wherein the manifest modification function computer device is further configured to:

determine, based on the comparison, that another given chunk of media content is damaged; and modifying, in response to determining that the another given chunk of media content is damaged, an another corresponding manifest entry associated with the another given chunk of media content to reference to the corresponding manifest entry in the another manifest file.

10. The method of claim 6, wherein locating the corresponding manifest entry comprises:

retrieving a plurality of corresponding manifest entries in the plurality of manifest files, each of the plurality of corresponding entries corresponding to the corresponding redundant copy of the given chunk of media content;

comparing the metadata associated with the plurality of corresponding manifest entries; and locating the corresponding manifest entry from the plurality of corresponding manifest entries based on the comparison.

* * * * *